(12) United States Patent
Probst et al.

(10) Patent No.: US 10,005,538 B2
(45) Date of Patent: Jun. 26, 2018

(54) AIRCRAFT WITH INWARDLY FOLDABLE REAR DOOR

(71) Applicant: AIRBUS HELICOPTERS DEUTSCHLAND GMBH, Donauworth (DE)

(72) Inventors: Stefan Probst, Buchdorf (DE); Wolfgang Huenecke, Donauworth (DE); Frank Loeser, Kaisheim (DE); Johannes Frese, Kaisheim (DE); Sebastian Mores, Munich (DE); Michael Matt, Ismaning (DE)

(73) Assignee: Airbus Helicopters Deutschland GmbH, Donauworth (DE)

( * ) Notice: Subject to any disclaimer, the term of this patent is extended or adjusted under 35 U.S.C. 154(b) by 149 days.

(21) Appl. No.: 15/005,265

(22) Filed: Jan. 25, 2016

(65) Prior Publication Data

US 2016/0214701 A1    Jul. 28, 2016

(30) Foreign Application Priority Data

Jan. 28, 2015    (EP) .................................... 15400004

(51) Int. Cl.
  *B64C 1/14* (2006.01)
  *B64D 11/00* (2006.01)
  *B64C 1/24* (2006.01)

(52) U.S. Cl.
  CPC .............. *B64C 1/1415* (2013.01); *B64C 1/24* (2013.01); *B64D 11/00* (2013.01)

(58) Field of Classification Search
  CPC ....... B64C 1/14; B64C 1/1407; B64C 1/1423; B64C 1/1461; B64C 1/24; B64C 1/1415
  See application file for complete search history.

(56) References Cited

U.S. PATENT DOCUMENTS

| | | | | |
|---|---|---|---|---|
| 2,196,546 A | * | 4/1940 | Bowers ................. | B64C 1/1407 182/77 |
| 2,380,091 A | * | 7/1945 | Watter ................. | B64C 1/1415 14/71.5 |
| 2,432,055 A | * | 12/1947 | Watter ................. | B64C 1/1415 244/118.3 |

(Continued)

FOREIGN PATENT DOCUMENTS

| | | |
|---|---|---|
| CN | 101723083 A | 6/2010 |
| EP | 1881928 | 12/2011 |

(Continued)

OTHER PUBLICATIONS

European Search Report for European Application No. EP 15400004, Completed by the European Patent Office dated Jul. 1, 2015, 4 Pages.

(Continued)

*Primary Examiner* — Tien Quang Dinh
*Assistant Examiner* — Michael A. Fabula
(74) *Attorney, Agent, or Firm* — Brooks Kushman P.C.

(57) ABSTRACT

An aircraft comprising a rear opening and a rear door to close such rear opening, wherein the rear door is attached to the fuselage of the aircraft by means of an arrangement having two links due to which the rear door can be displaced longitudinally and in elevation up to a position at the interior of the fuselage.

17 Claims, 8 Drawing Sheets

(56) References Cited

U.S. PATENT DOCUMENTS

| | | | | |
|---|---|---|---|---|
| 2,523,723 A * | 9/1950 | Hess | B64C 1/22 | 244/137.1 |
| 2,752,114 A * | 6/1956 | Pierre | B60J 5/125 | 244/118.3 |
| 2,923,981 A * | 2/1960 | Beck | E05D 15/425 | 49/205 |
| 2,942,812 A * | 6/1960 | Pauli | B64C 1/1415 | 114/117 |
| 2,942,813 A * | 6/1960 | Le Roy | B64C 1/1415 | 244/113 |
| 3,128,068 A * | 4/1964 | Pauli | B64C 1/1415 | 160/212 |
| 3,147,942 A * | 9/1964 | Griffith | B64C 1/1415 | 160/202 |
| 3,213,962 A * | 10/1965 | Clark, Jr. | B64C 1/1407 | 182/78 |
| 3,424,411 A * | 1/1969 | Blunschi, Sr. | B64C 1/1415 | 244/118.1 |
| 3,430,382 A * | 3/1969 | Metz | B64C 1/1415 | 244/129.5 |
| 3,544,046 A * | 12/1970 | Babkin | B64C 1/1415 | 244/129.5 |
| 3,687,308 A * | 8/1972 | Apelstrand | B63B 27/143 | 14/71.1 |
| 3,718,171 A * | 2/1973 | Godwin | B64C 1/1415 | 160/188 |
| 3,799,479 A * | 3/1974 | Roeder | B64C 1/22 | 244/137.1 |
| 3,836,101 A * | 9/1974 | Mattia | B64C 1/1415 | 14/71.5 |
| 4,032,092 A * | 6/1977 | Day | B64C 1/1415 | 14/71.5 |
| 4,039,163 A * | 8/1977 | Shorey | B64C 1/22 | 14/71.5 |
| 4,068,770 A * | 1/1978 | Boehringer | B60R 3/02 | 14/71.1 |
| 4,088,288 A * | 5/1978 | Barnes | B64C 1/1415 | 14/69.5 |
| 4,097,009 A * | 6/1978 | Barnes | B64C 1/1415 | 244/129.5 |
| 4,140,291 A * | 2/1979 | Evans | B64C 1/1415 | 244/118.3 |
| 4,167,258 A * | 9/1979 | Robertson | B64C 1/1415 | 244/129.5 |
| 4,344,726 A * | 8/1982 | Naffa | B64D 9/00 | 104/250 |
| 4,440,364 A * | 4/1984 | Cone | B64C 1/24 | 16/282 |
| 4,453,684 A * | 6/1984 | Hanks | B64C 1/24 | 105/430 |
| 4,498,648 A * | 2/1985 | DeLuca | B64C 1/1415 | 244/118.3 |
| 4,832,286 A * | 5/1989 | Brookes | B64C 1/1415 | 244/118.3 |
| 4,879,843 A * | 11/1989 | Hamamoto | B61D 19/009 | 105/436 |
| 5,014,935 A * | 5/1991 | Dalbera | B64C 1/22 | 244/137.1 |
| 5,022,610 A * | 6/1991 | Ensign | B64C 1/22 | 244/118.3 |
| 5,241,722 A * | 9/1993 | Rohrlick | B64C 1/22 | 14/71.5 |
| 5,253,381 A * | 10/1993 | Rawdon | B64C 1/22 | 14/71.5 |
| 5,335,880 A * | 8/1994 | Klug | B64C 1/1415 | 105/280 |
| 5,823,473 A * | 10/1998 | Odell | B64C 1/1415 | 244/129.5 |
| 7,275,717 B2 * | 10/2007 | Landry | B64C 1/22 | 244/129.5 |
| 8,141,821 B1 | 3/2012 | Pancotti et al. | | |
| 8,215,581 B1 * | 7/2012 | Kulesha | B64C 1/1415 | 244/118.3 |
| 8,448,278 B1 * | 5/2013 | Beilstein | B65G 69/30 | 14/69.5 |
| 9,010,685 B2 * | 4/2015 | Muller-Dauch | B64C 1/1415 | 244/118.3 |
| 9,651,951 B2 * | 5/2017 | De La Bardonnie | G05D 3/00 | |
| 2005/0178601 A1 * | 8/2005 | Galvani | B64C 1/1407 | 180/271 |
| 2006/0261216 A1 * | 11/2006 | Landry | B64C 1/22 | 244/129.5 |
| 2007/0045472 A1 * | 3/2007 | Erben | B64C 1/14 | 244/129.5 |
| 2007/0283512 A1 * | 12/2007 | Yada | B64C 1/24 | 14/71.1 |
| 2008/0099605 A1 * | 5/2008 | Yada | B64C 1/143 | 244/118.3 |
| 2008/0219830 A1 * | 9/2008 | Wells | B64C 1/1415 | 414/809 |
| 2010/0019089 A1 * | 1/2010 | Sibley | B64C 1/1407 | 244/129.5 |
| 2010/0096508 A1 * | 4/2010 | Pancotti | B64C 1/1415 | 244/7 R |
| 2010/0127124 A1 * | 5/2010 | Yada | B64C 1/1461 | 244/118.3 |
| 2011/0121135 A1 * | 5/2011 | Maguire | B64F 1/32 | 244/121 |
| 2011/0253834 A1 * | 10/2011 | Carter | B64C 1/143 | 244/118.3 |
| 2012/0061517 A1 * | 3/2012 | Pancotti | B64C 1/1415 | 244/129.5 |
| 2013/0082141 A1 * | 4/2013 | Koch | B64C 1/1469 | 244/118.5 |
| 2013/0284855 A1 * | 10/2013 | Muller-Dauch | B64C 1/1415 | 244/129.5 |
| 2014/0138488 A1 * | 5/2014 | Berthoud | E05D 13/123 | 244/129.5 |
| 2015/0175251 A1 * | 6/2015 | Heinen | B64C 1/24 | 244/137.2 |
| 2015/0353182 A1 * | 12/2015 | Urban | E05F 15/60 | 244/129.5 |
| 2016/0185441 A1 * | 6/2016 | De La Bardonnie | B64C 1/24 | 244/118.3 |
| 2016/0200416 A1 * | 7/2016 | Steger | B64C 1/1461 | 244/129.5 |
| 2016/0332716 A1 * | 11/2016 | Kammerer | B64C 1/1407 | |

FOREIGN PATENT DOCUMENTS

| | | |
|---|---|---|
| RU | 516230 A1 | 10/1996 |
| RU | 1203822 A1 | 10/1996 |

OTHER PUBLICATIONS

Chinese Office Action for Application No. 201610055093.7, dated Aug. 28, 2017 and associated English translation, 16 pages.

Russian Search Report for Application No. RU 2015156463, dated May 5, 2017, 4 Pages.

First Office Action for Chinese Application No. 201610055093.7, dated Jul. 4, 2017, 5 Pages.

* cited by examiner

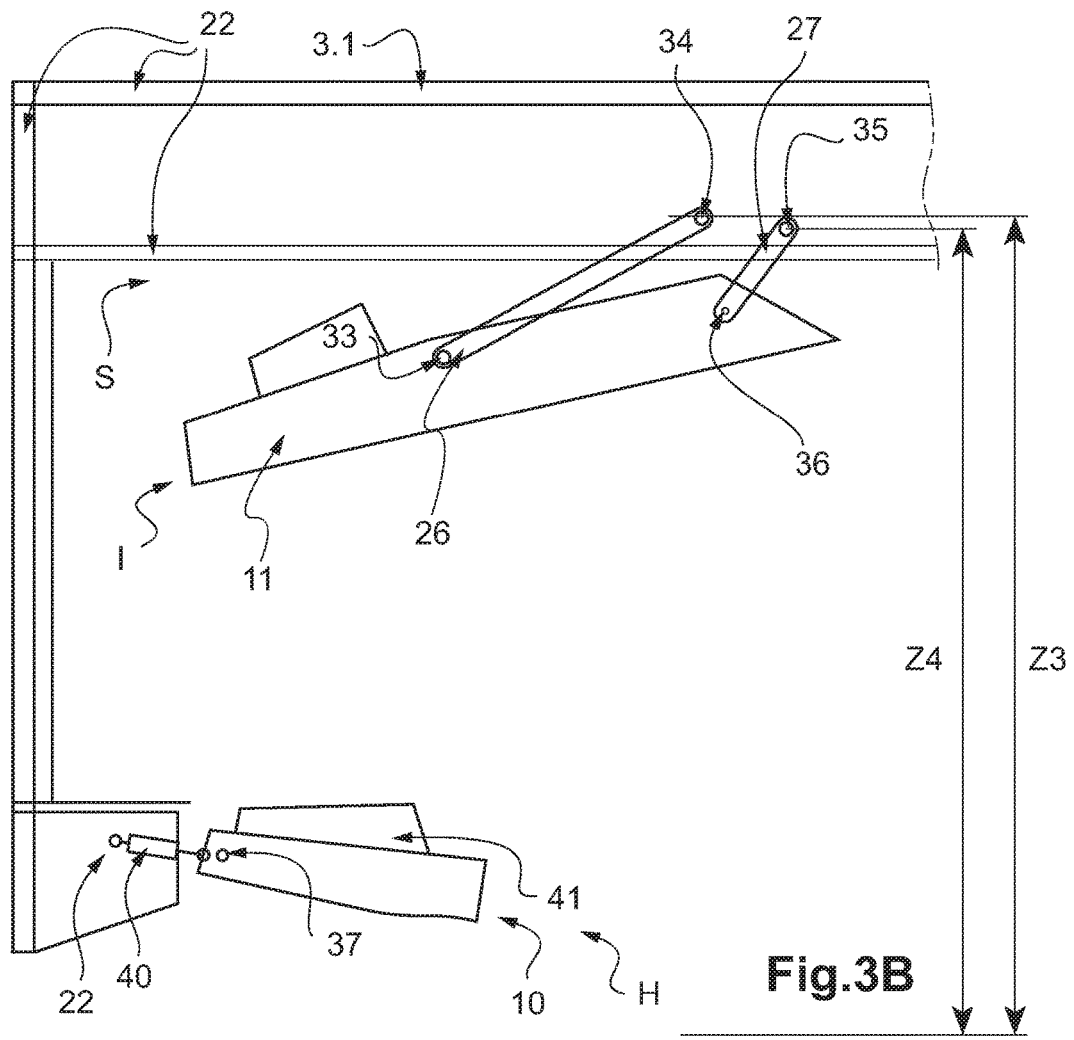

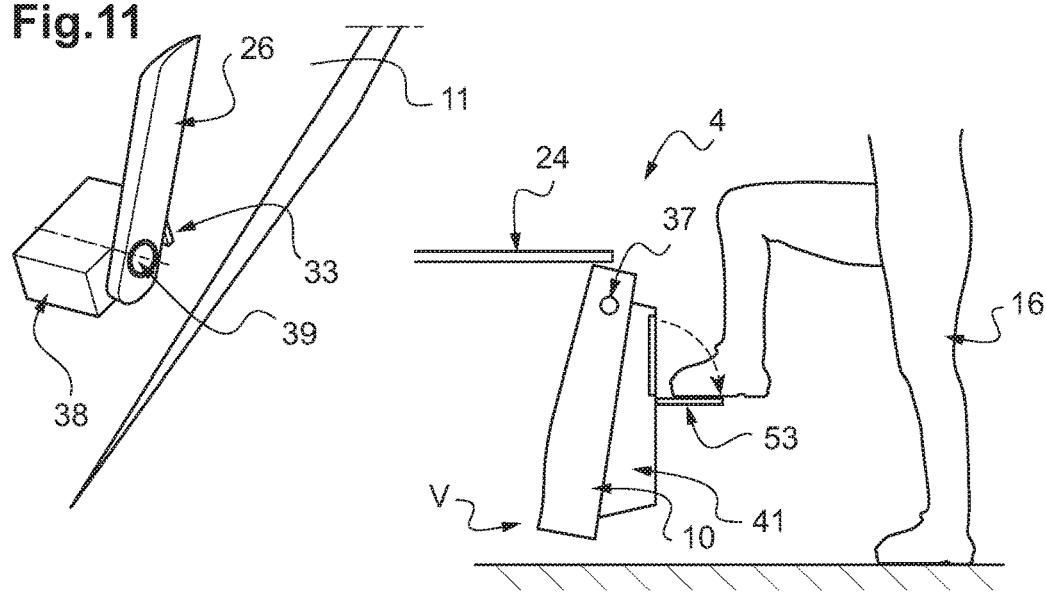
Fig.11
Fig.8
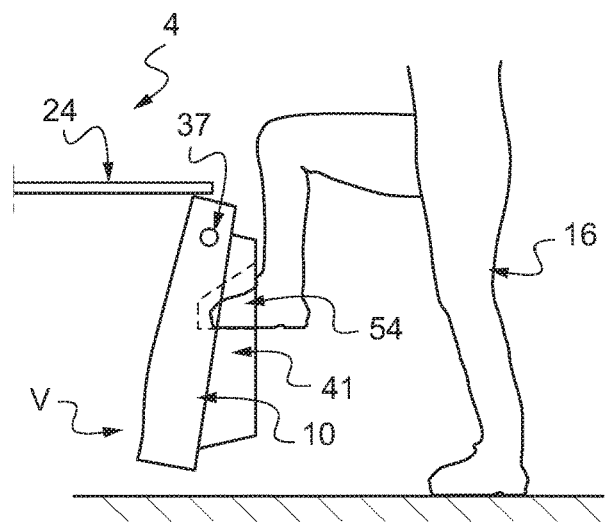
Fig.9
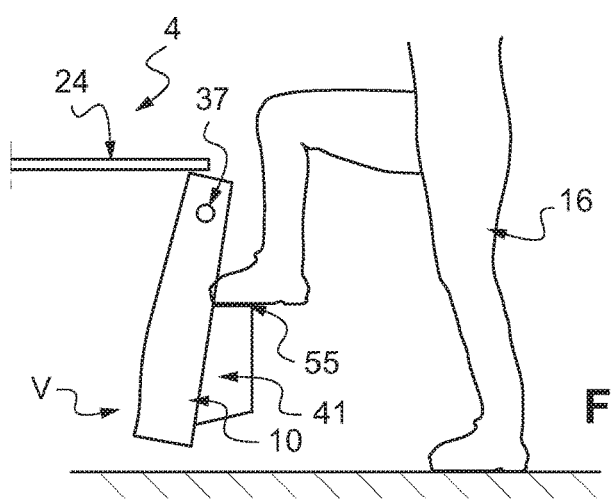
Fig.10

AIRCRAFT WITH INWARDLY FOLDABLE REAR DOOR

CROSS REFERENCE TO RELATED APPLICATION

This application claims priority to European patent application No. EP 15 400004.6 filed on Jan. 28, 2015, the disclosure of which is incorporated in its entirety by reference herein.

BACKGROUND OF THE INVENTION (1) Field of the Invention

The present invention belongs to the field of arrangements for moving a rear door of an aircraft, particularly for rear doors that open inwardly, that is, toward the interior of the fuselage.

(2) Description of Related Art

Rear doors for aircrafts, and especially for rotorcrafts, are advantageous in that the general operability and accessibility are better than when the loading takes place through a side door. Rear doors which, moreover, are able to open inwardly present some additional benefits when compared, for instance, to clamshell doors that open outwardly in a swinging manner—for example, they are not an obstacle for sliding doors attached to the side of the fuselage or for moving and working around the aircraft, which is of the utmost importance when operators intend to load a person into the aircraft in a terrain with space constrictions, such as in rocky mountainous areas.

Besides, rear doors opening inwardly are not affected by the rotor downwash if the rotor is in operation when the doors are open—in clamshell doors, the holding means, such as hinges, mounts and dampers, must be designed to withstand the downwash of the rotor, and the operator opening the door needs more force to push against the downwash. The ambient temperature variations inherent to the different performances of the rotorcraft lead to a significant decrease of the holding means properties, due to the heating and cooling of the internal oil. Moreover, dirty working conditions cause an increased abrasion of the holding means' sealing. All of this makes it difficult to optimize the design of clamshell doors' holding means capable of bearing the downwash.

Furthermore, the aircraft's rear part is a critical design element for the reduction of aerodynamic drag—in order to achieve so, the silhouette of the rear part is often streamlined, which leads to a design commonly referred to, in aircrafts, as fishtail. However, in rotorcrafts, the rear loading accessibility is limited when the rear part, including the tailboom, is streamlined—it is therefore difficult to reach a compromise between a good accessibility and acceptable drag values. As a result from this, rear clamshell doors for aircrafts are normally heavy and not easy to operate with. Contrarily, rear doors which open inwardly have a good aerodynamic performance without limiting the rear loading capability.

Some prior art documents propose alternatives to clamshell doors based on rear doors which open outwardly with respect to the fuselage.

The patent EP 1881928 B1 describes a single rear door sliding outwardly up to the lower region of the tailboom. This solution requires robust and heavy attachments and, when in an open position, the door is affected by the rotorwash. Besides, the open door reduces the space under the tailboom.

The U.S. Pat. No. 3,147,942 discloses a closure and loading device for closing an opening in a cargo carrying compartment and for functioning at the same time as a cargo loading and unloading means when it opens outwardly.

The U.S. Pat. No. 5,241,722 describes a ramp system for cargo aircrafts divided in a fore and an aft ramp, the fore section being capable of moving in the pitch direction relative to the aircraft.

Rear doors capable of being housed at the interior of the fuselage are also known in the art.

The U.S. Pat. No. 8,141,821 B1 discloses a rear door having an upper and a lower wall, wherein the lower wall opens outwardly in a sliding manner up to a position in which it is adjacent to the lower part of the fuselage, and the upper wall opens inwardly by means of an arrangement consisting of a variable-length actuator and of an axis, located on the upper edge of an opening, around which the upper wall rotates guided by the telescopic extension of the actuator.

Likewise, the U.S. Pat. No. 4,097,009 describes another rear door with two walls, the upper one opening inwardly and the lower one opening towards the exterior of the aircraft. The arrangement operating the lower wall is capable of locking such wall at a certain position in which this wall plays the role of a ramp cargo door; the arrangement for the upper door comprises an actuator, in the form of a piston and a cylinder, and a hinge around which the wall can rotate.

The arrangements for inwardly folding a rear door by rotating the door around a fixed axis or hinge do not provide the versatility of movements necessary to place the folded rear door at a position where there are less space constraints.

BRIEF SUMMARY OF THE INVENTION

The invention aims at reducing this drawback by providing an aircraft which comprises: a rear door, a landing gear, a fuselage extending longitudinally between a nose and a rear part, and extending in elevation between a lower part and an upper part, the lower part being the part of the fuselage on which the landing gear is mounted and the rear part in turn comprising a rear opening which can be closed by the rear door, and an arrangement comprising:

a first link comprising a first main body, a first door attaching means and a first fuselage attaching means, the first main body extending along a first length between the first door attaching means and the first fuselage attaching means, and the first link being pivotally attached to the rear door by means of the first door attaching means and being pivotally attached to the fuselage by means of the first fuselage attaching means, and a second link comprising a second main body, a second door attaching means and a second fuselage attaching means, the second main body extending along a second length, greater than the first length, between the second door attaching means and the second fuselage attaching means, and the second link being pivotally attached to the rear door by means of the second door attaching means and being pivotally attached to the fuselage by means of the second fuselage attaching means, wherein the first and second fuselage attaching means are attached to the fuselage, and wherein the second fuselage attaching means is located longitudinally closer to the nose of the fuselage than the first fuselage attaching means, such that when the first and the second links rotate around the first and the second fuselage attaching means, the rear door rotates around the first and the second door attaching means, so that the rear door can be inwardly displaced in the longitudinal direction and in the elevation direction between a first position wherein the rear door closes the rear opening and at least a second position at the interior of the fuselage wherein the rear door extends along the longitudinal direction.

The term landing gear includes any landing means suitable for allowing an adequate contact between the aircraft and the ground during landing.

The aircraft's fuselage comprises in its rear part the rear opening which can be at least partially closed by the rear door. The opening and closing of such rear door is achieved by means of an arrangement due to which the movement of the door is not restricted to a mere rotation about a hinge.

The first and second main bodies are, in an embodiment, straight rods, but other configurations are also possible. Both main bodies extend between door attaching means and fuselage attaching means, the length of the second main body being greater than the length of the first main body. This difference of lengths contributes to providing the inventive folding of the door.

The first and second fuselage attaching means and the first and second door attaching means are intended for allowing a pivotal attachment between the first and the second links and both the fuselage and the door. For this purpose, the attaching means comprise, in an embodiment, a bearing, such as a ball bearing, a spherical bearing or a bush bearing, which allows the rotation of the link with regard to the door and to the fuselage around at least one axis.

The first and second fuselage attaching means are attached to the fuselage. In an example, they are attached to the upper part of the fuselage; more particularly, they can be attached to a frame forming the internal part of such upper part of the fuselage.

The second fuselage attaching means of the second link is located longitudinally closer to the nose of the fuselage than the first fuselage attaching means of the first link. This geometry, together with the fact that the links are pivotally attached to the rear door and to the fuselage, allows for the translational motion of all the points of the rear door, that is, the rear door's movement is not limited to a rotation around a fixed point. As a result, the entire rear door can be displaced longitudinally and in elevation up to at least a second position at the interior of the fuselage wherein the rear door extends along the longitudinal direction. Such second position, adjacent to the upper part of the fuselage, is intended to minimize the reduction of space within the cabin and to avoid the obstruction of the rear opening that would take place if the rear door were hinged to an edge of the rear opening. The displacement of the rear door may continue up to a final position beyond the second position, such that even more space is freed up by further approaching the rear door to the upper part of the fuselage.

Furthermore, the present invention achieves a reduction of the overall stress exerted on the parts of the arrangement and on the rear door itself. This implies that the rear door needs not be heavy—a light structure is sufficient to withstand the loads resulting from this configuration.

The first fuselage attaching means can be located, in elevation, closer to the lower part of the fuselage than the second fuselage attaching means. This offset of the position in elevation of the first and second fuselage attaching means contributes to the above described kinematic of the rear door.

Likewise, the first door attaching means can be located longitudinally farther from the nose than the first fuselage attaching means, and the second door attaching means can be located longitudinally closer to the nose than the second fuselage attaching means, when the door is at the first position. Such orientation of the first and the second main bodies do also help, together with the geometrical features above described, to enhance the movement of the rear door towards the second and final positions.

Each one of the first and second door attaching means and of the first and second fuselage attaching means can comprise a damper in order to smooth the movement of the links.

Since the arrangement for attaching the door to the fuselage is intended for leaving the rear opening free of obstacles, the rear door can be advantageously combined with further features suitable for providing an easy access to the interior of the fuselage.

The aircraft can also comprise an auxiliary door suitable for closing the rear opening in a complementary manner with the rear door, the rear door and the auxiliary door being in contact along a closing boundary when both the rear door and the auxiliary door close the rear opening.

By complementary manner it is meant that the rear door and the auxiliary door are capable of completely closing the rear opening when they are in contact along the closing boundary. Besides, the rear door and the auxiliary door can be independently locked when in the closing position, which results in a partial closing of the rear opening that is helpful, for instance, to load pieces of equipment longer than the fuselage.

The auxiliary door can be opened outwardly, and it can be hingedly attached to the fuselage with an auxiliary pivoting means, such as a hinged arrangement.

Moreover, the auxiliary pivoting means may comprise auxiliary dampers so as to smooth the movement of the auxiliary door, and this means may also comprise a locking means suitable for locking the auxiliary door at an outward position with respect to the fuselage. The variability of positions in which the auxiliary door can be locked permits adjusting the position to the needs of the mission that the aircraft performs.

The locking means can lock the auxiliary door at a first outward position in which the auxiliary door substantially extends along the longitudinal direction of the aircraft. This first outward position is adequate for many of the missions an aircraft, and particularly a military aircraft, can carry out—it allows military troops to sit on the auxiliary door for protecting the aircraft, or to stand on it before skydiving; it also permits the medical assistance to safely lay a stretcher on a horizontal surface; and it serves as a prolongation of a floor of the fuselage when load items longer than the fuselage need to be stored, if the auxiliary door and/or the rear door are left open.

The locking means can also lock the auxiliary door at a second outward position in which the auxiliary door substantially extends along the elevation direction of the aircraft. The second outward position is preferable when a further clearance of the opening is desired, or to improve the access of persons. In this respect, the auxiliary door may include a step suitable for allowing the access of the person to the interior of the fuselage. It should be noted that this feature is compatible with any of the positions of the auxiliary door. The step can be either integrated in the auxiliary door or detachable.

Similarly, the locking means can lock the auxiliary door at a third outward position in which the auxiliary door is suitable for being used as a cargo ramp door. Such third outward position can be combined with the provision of any load assisting means, such as extension ramps suitable for linking the auxiliary door with the ground or stretch loading devices; the load assisting means facilitate the loading of heavy external equipment that cannot be easily hoisted into the interior of the fuselage, such as vehicles like motorbikes, trikes, quads or skidoos and rolling containers.

The auxiliary door may comprise tracks suitable for allowing the access of the vehicle to the interior of the fuselage. Although this feature is more suitable for the example wherein the auxiliary door acts as ramp cargo door, the tracks can also be combined with other embodiments— for instance, with an auxiliary door lockable in a longitudinal position.

The rear door may comprise an integrated storage compartment which allows taking advantage of the inner space of the auxiliary door to store material, e.g. mats, flashlights or blankets. Likewise, the auxiliary door may comprise a similar auxiliary integrated storage compartment.

The rear door and the auxiliary door can be designed for a manual use; although this alternative does not need for an additional support, it can be equipped with a small force assisting device, e.g. a spring activated gas damper or Bowden cables. The rear door and the auxiliary door can also be operated with an actuator suitable for automatically open and close the doors. Additionally, both doors may be interconnected with one another by means of cables, in order to predefine a certain motion for the opening process.

BRIEF DESCRIPTION OF THE DRAWINGS

These and other features and advantages of the invention will become more evident from the following detailed description of preferred embodiments, given only by way of illustrative and non-limiting example, in reference to the attached figures:

FIGS. 3A, 3B, and 3C are more detailed views of the rear door and the first and second links, further representing the movement of the rear door in a first, second, and third position, respectively.

FIG. 8 shows an auxiliary door comprising a foldable step.

FIG. 9 also shows a step, but integrated within the body of the auxiliary door.

FIG. 10 shows an embodiment wherein the step is the top part of the auxiliary integrated storage compartment.

FIG. 11 shows a detailed view of an example of a door attaching means.

DETAILED DESCRIPTION OF THE INVENTION

Figure 1:
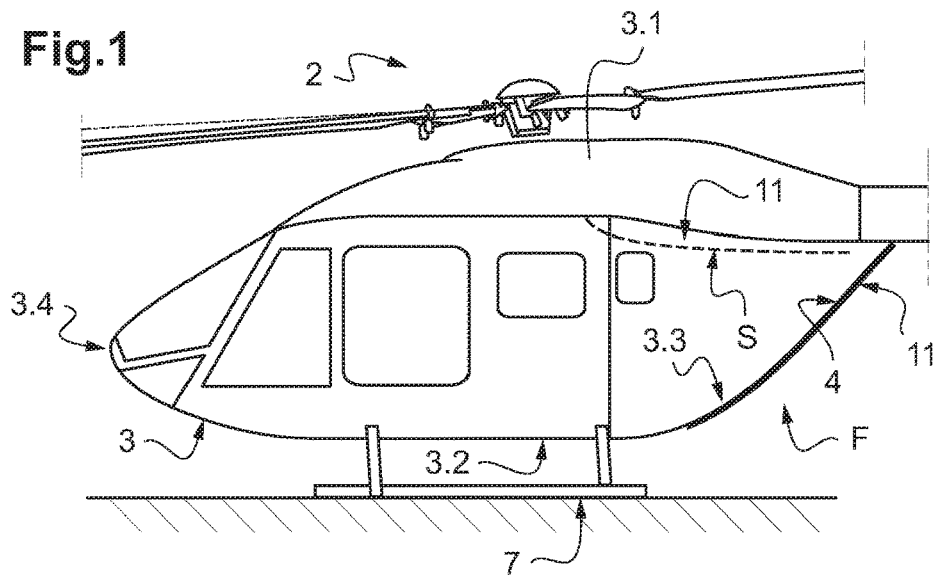
FIG. 1 is a general view of a rotorcraft comprising a rear door which is able to open inwardly.

FIG. 1 shows a general overview of a rotorcraft 1 in which a rear opening 4 is completely closed by a rear door 11. The dashed lines represent the location of the rear door 11 when placed at a second position S, adjacent to an upper part 3.1 of a fuselage 3 and extending, substantially, along the longitudinal direction of the rotorcraft 1. Although they have not been represented, the embodiment of FIG. 1 comprises a first 27 and a second 26 links pivotally attached to the rear door 11 and to the fuselage 3.

The rotorcraft of FIG. 1 comprises a rotor 2 mounted on the upper part 3.1 of the fuselage 3 and a landing gear 7 mounted on a lower part 3.2 of the fuselage 3, the lower part 3.2 of the fuselage 3 being opposite the upper part 3.1 in the elevation direction, that is, according to the vertical direction of the figure; longitudinally—horizontally, in the figure— the fuselage 3 extends between a nose 3.4 and a rear part 3.3, the latter comprising the rear opening 4 closable by the rear door 11.

The rotorcraft of FIG. 1, save for the features referring to the way of closing the rear opening 4, is the same as in the embodiment of figures from 2 to 12.

Figure 2:
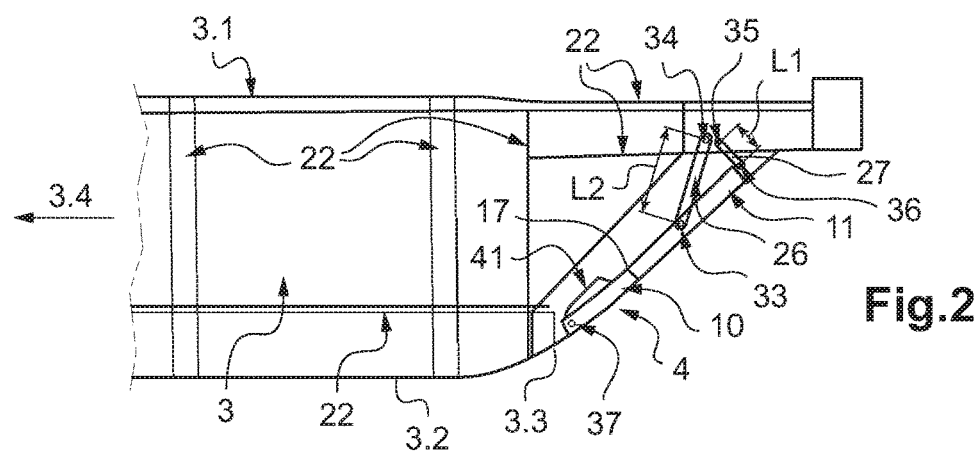
FIG. 2 is a view of a longitudinal section of an aircraft whose rear door can be inwardly opened by means of a first and a second link.

The rear opening 4 of the rotorcraft 1 of FIG. 2 is closed by the rear door 11 and by an auxiliary door 10, the auxiliary door 10 being located lower than the rear door 11 with reference to the figure. In such position, both doors 11, 10 are in contact along a closing boundary 17. The rear door 10 is attached to the fuselage 3 by means of the first link 27 and the second link 26. The first link 27 is pivotally attached to the rear door 11 by means of a first door attaching means 36 and pivotally attached to a frame 22 of the upper part 3.1 of the fuselage 3 by means of a first fuselage attaching means 35.

Likewise, the second link 26 is pivotally attached to the rear door 11 by means of a second door attaching means 33 and pivotally attached to the frame 22 of the upper part 3.1 of the fuselage 3 by means of a second fuselage attaching means 34.

In FIG. 2, the first link 27 comprises a first main body extending along a first length L1 between the first door attaching means 36 and the first fuselage attaching means 35, and the second link 26 comprises a second main body extending along a second length L2, greater than the first length L1, between the second door attaching means 33 and the second fuselage attaching means 34.

Each one of the first 36 and second 33 door attaching means and of the first 35 and second 34 fuselage attaching means may comprise a bearing 39 mounted on a mount 38 by means of which the first 27 and the second 26 links are attached to the fuselage 3 and to the rear door 11. FIG. 11 represents such an attachment between the second link 26 and the rear door 11.

The auxiliary door 10 is in turn attached to the fuselage 3 by means of an auxiliary pivoting means 37. The auxiliary door 10 of this embodiment additionally comprises an auxiliary integrated storage compartment 41 on the side facing the interior of the fuselage 3, with reference to FIG. 2.

In the closed position of the rear door 11 represented in FIG. 2, referred to as first position F, the first 35 and second 34 fuselage attaching means are located in elevation, that is, according to the vertical direction of the figure, farther from the lower part 3.2 of the fuselage 3 than the rear opening 4; besides, the second fuselage attaching means 34 is located longitudinally closer to the nose 3.4 of the fuselage 3 than—with reference to the figure, the second fuselage attaching means 34 is located at the left hand side of—the first fuselage attaching means 35.

Figure 3A:
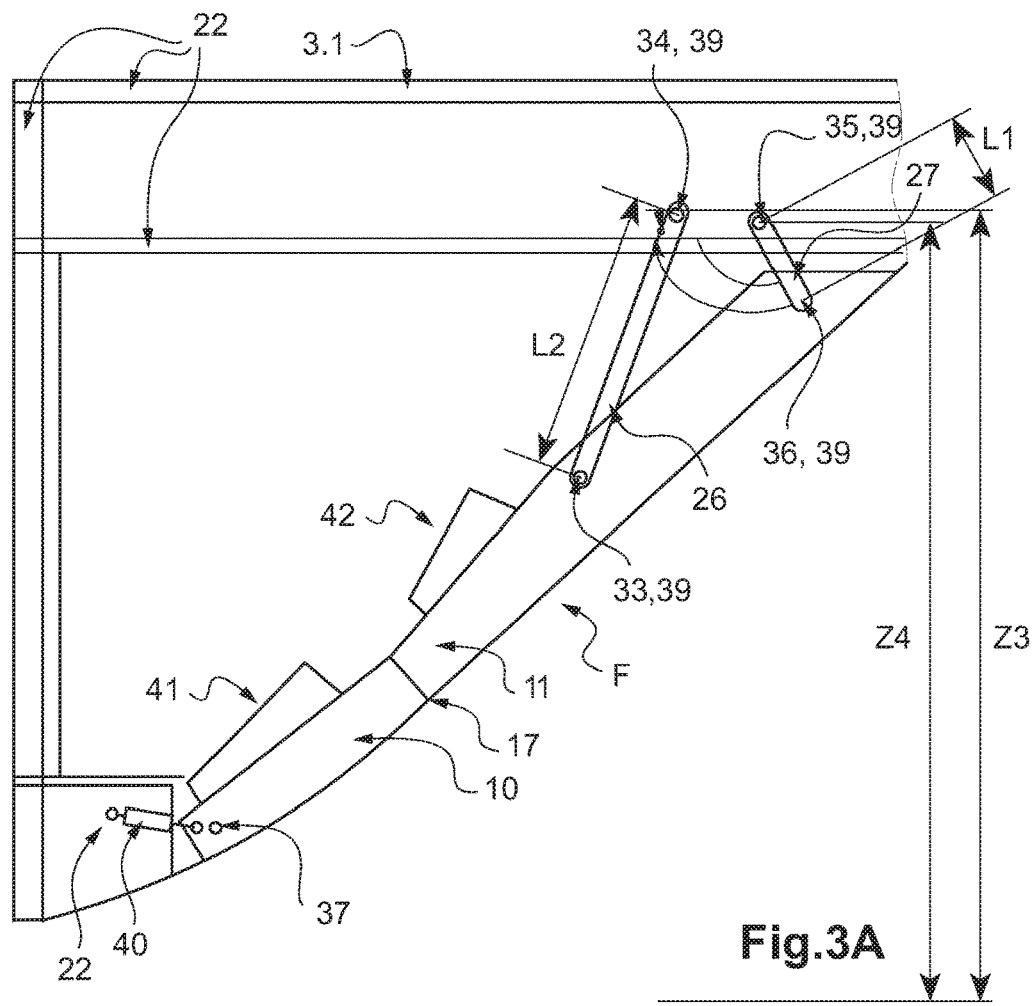
Figure 3C:
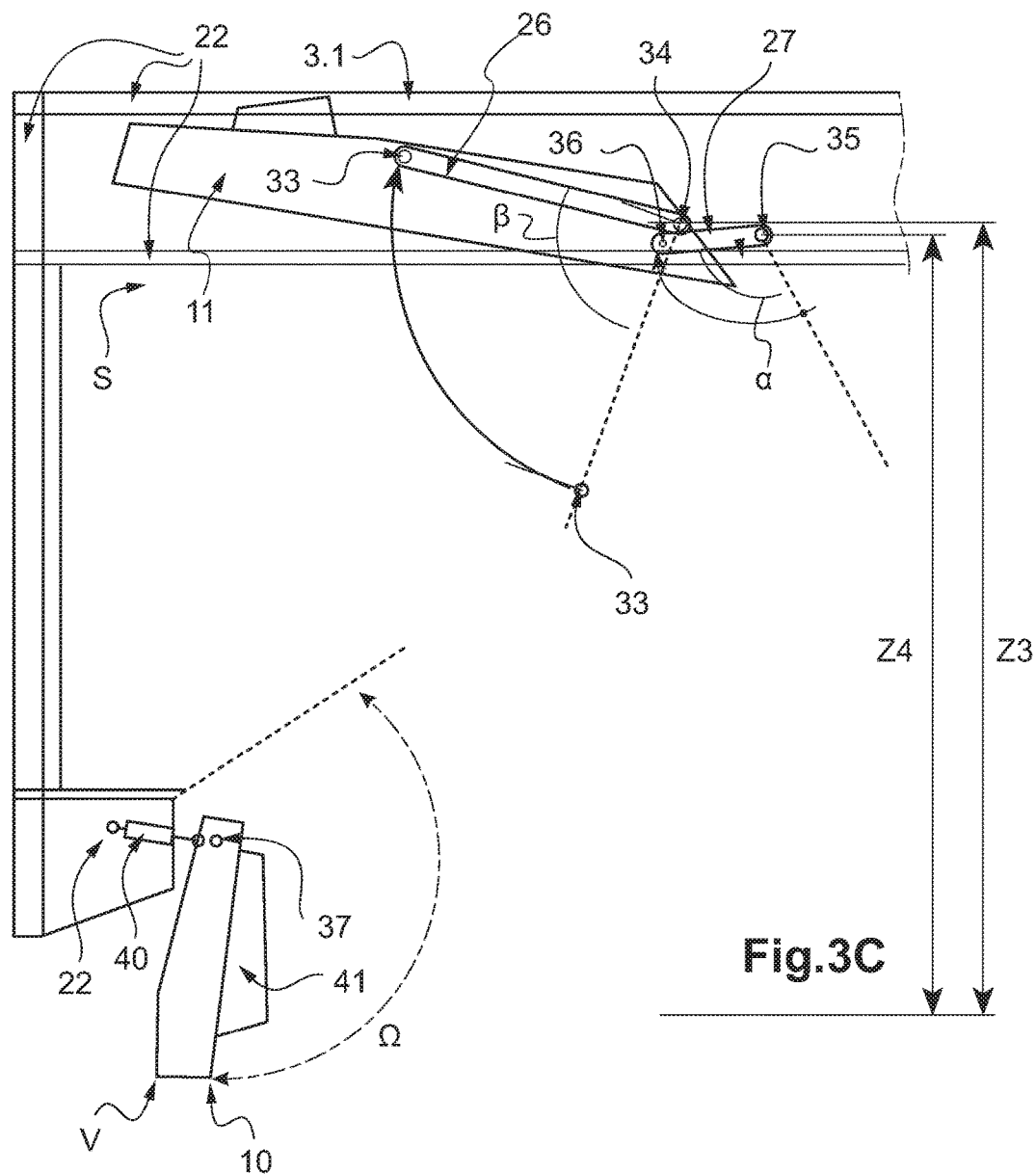

FIGS. 3A, 3B, and 3C show different positions of both the rear door 11 and the auxiliary door 10. The situation represented in FIG. 3A corresponds to that of FIG. 2, wherein the rear door 11 is in the first position F and both the rear door 11 and the auxiliary door 10 close the rear opening 4, being in contact along the closing boundary 17. In the embodiment of FIG. 3A-3C, the auxiliary pivoting means 37 further comprises an auxiliary damper 40 which smoothes the movement of the auxiliary door 10.

In FIGS. 3A-3C, the rear door 11 opens inwardly, that is, towards the interior of the fuselage 3, as represented in the two positions depicted in FIGS. 3B and 3C. The intermediate position I is shown to illustrate the movement between the first position F and a final position beyond the second position S. The attachment of the rear door 11 to the frame 22 of the fuselage 3 by the first 27 and second 26 links, both of them being pivotally attached to the frame 22 of the fuselage 3 and to the door 11, allows for a displacement of the rear door 11 towards the upper part 3.1 and the nose 3.4 of the fuselage 3, following the reference of FIG. 3A-3C. Such movement is advantageous in that the rear door 11 is not restricted to rotate about a fixed point, as in conventional arrangements—the longitudinal movement, corresponding, as has been explained, to a movement towards the left hand side of FIG. 3A-3C, drives the rear door 11 up to the final position beyond the second position S, wherein there is more space for being housed, thus eliminating any hindrance in the surroundings of the rear opening 4.

In the embodiment of FIG. 3, the location in elevation of the first fuselage attaching means 35 and the second fuselage attaching means 34 is defined, respectively, by a fourth height Z3 and a fifth height Z4. The fourth height Z3 is the maximum difference in elevation between the first fuselage attaching means 35 and lowermost point of the landing gear 7; the fifth height Z4 is the maximum difference in elevation between the second fuselage attaching means 34 and such lowermost point of the landing gear 7. In an example, the fourth height Z3 ranges between 0.48 and 1.07 times the fuselage width, preferably 0.9 times, and the fifth height Z4 ranges between 0.51 and 1.12 times the fuselage width, preferably 0.926 times.

The fuselage width is defined as the maximum distance in a direction perpendicular to both the longitudinal and the elevation directions between points of the fuselage.

The amplitudes of the rotations of the first 27 and second 26 links around the first 35 and second 34 fuselage attaching means are respectively defined, in an embodiment, by a first link angle α and by a second link angle β. The values of the first link angle α and of the second link angle β are 0° when the rear door 11 is at the first position F. In an embodiment, the first link angle α can vary between such 0° value and 150°, more preferably between 0° and 120°, when the rear door 11 moves from the first position F to the final, folded position. Likewise, the second link angle β can vary between 0° and 120°, more preferably between 0° and 85°, when the rear door 11 moves from the first position F to the final position.

The auxiliary door 10 of this embodiment is designed to open outwardly, as shown by the lower section of FIGS. 3B and 3C. In a first outward position H, the auxiliary door 10 extends along the longitudinal direction of the rotorcraft 1, that is, horizontally in the reference of FIG. 3B. In a second outward position V, the auxiliary door 10 extends along the elevation direction of the aircraft, i.e. vertically according to the directions of FIG. 3C. To maintain the auxiliary door 10 fixed at any outward position, the auxiliary pivoting means 37 may comprise an auxiliary locking means.

Figure 12A:
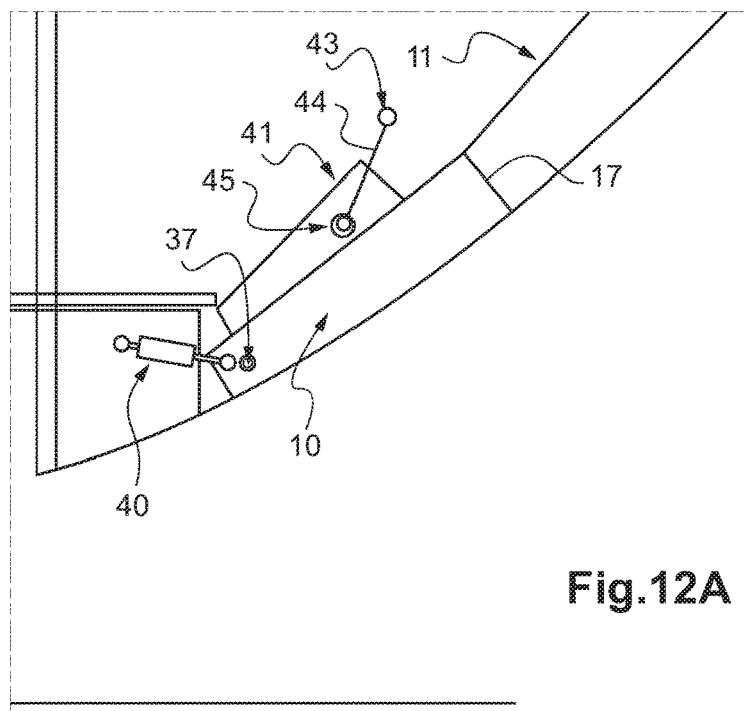
FIGS. 12A, 12B, and 12C represent a particular embodiment of an auxiliary locking means in a first, second, and third position, respectively.
Figure 12B:
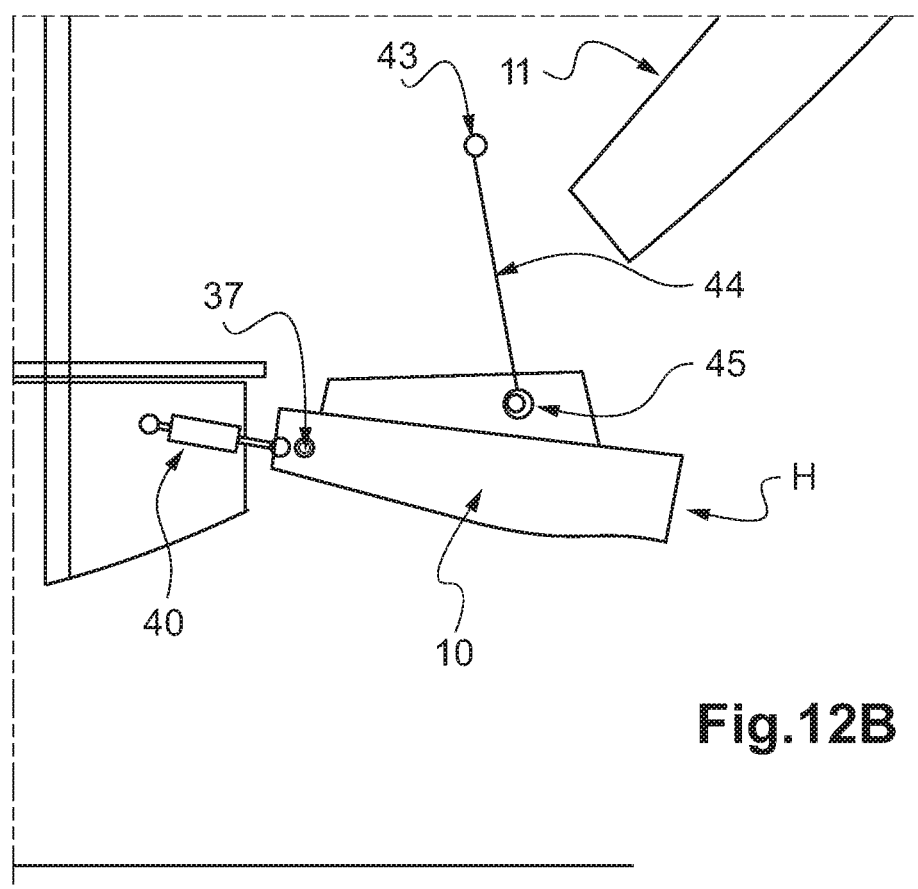
Figure 12C:
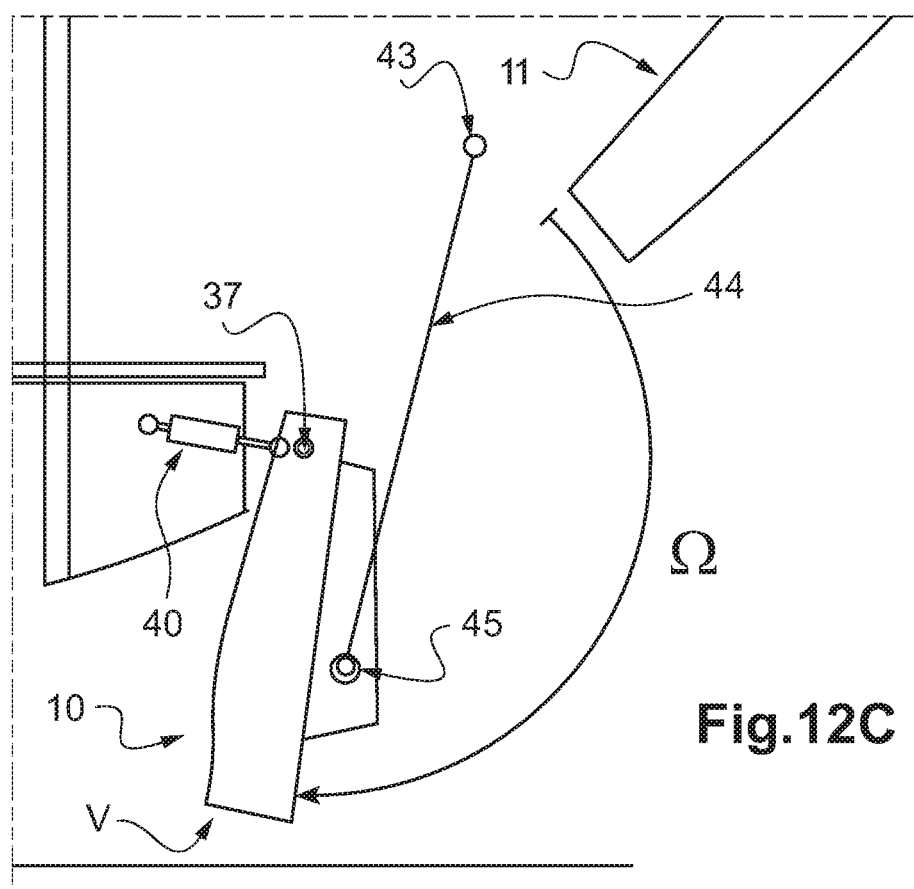

In an example, the auxiliary locking means comprises a tube 45 in which a strap 44 can rolled. The strap 44 is connected, at an end opposite the tube 45, to an auxiliary mount 43 mounted on the fuselage 3. When the auxiliary door 10 is at the desired position, for instance at the first outward position H or at the second outward position V, the strap 44 is locked in the tube 45, thus locking the auxiliary door 10 at such position. When the strap 44 is unlocked, by means of, for example, a release button, the strap 44 can rolled in or released from the tube 45, and therefore the auxiliary door 10 can be moved to a different position. This particular example of locking means is depicted in FIG. 12A-12C.

The amplitude of the rotation of the auxiliary door 11 around the auxiliary pivoting means 37 is, in an embodiment, represented by an auxiliary door angle Ω, as shown in FIG. 3. In an example, the auxiliary door angle Ω can range between 0°, when the auxiliary door 10 closes partially or complementarily with the rear door 10 the rear opening 4, and 200°, when the auxiliary door is at the second outward position V.

Figure 4:
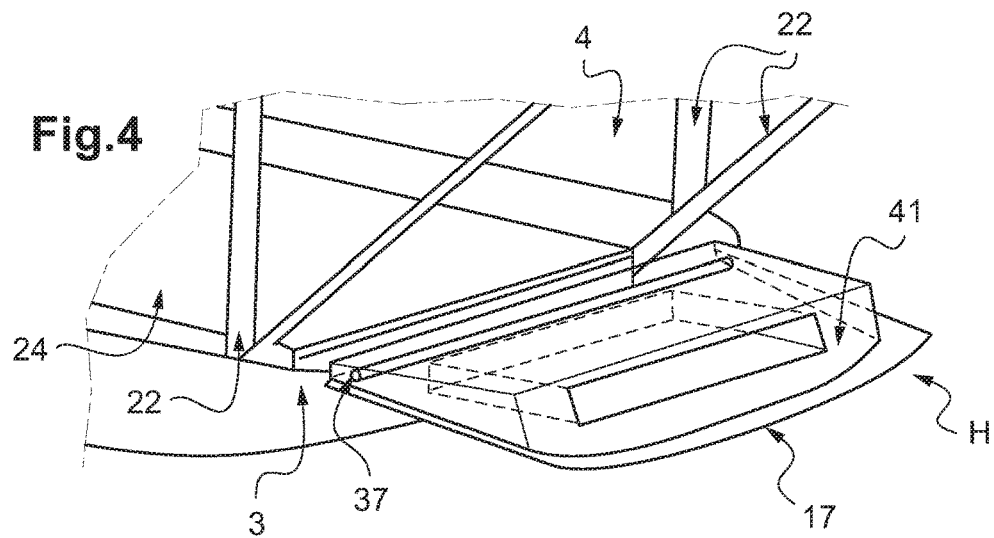
FIG. 4 shows in detail an auxiliary integrated storage compartment of the auxiliary door.

The rear door 11 of FIG. 3 comprises an integrated storage compartment 42, and the auxiliary door 10 comprises the auxiliary integrated storage compartment 41, represented in more detail in the embodiment of FIG. 4. Apart from depicting the auxiliary integrated storage compartment 41, FIG. 4 also shows the auxiliary pivoting means 37 being located at the side of the auxiliary door 11 in contact with the fuselage 3. The auxiliary door of FIG. 4 is locked at the first outward position H in which it extends along the longitudinal direction of the fuselage 3.

Figure 5:
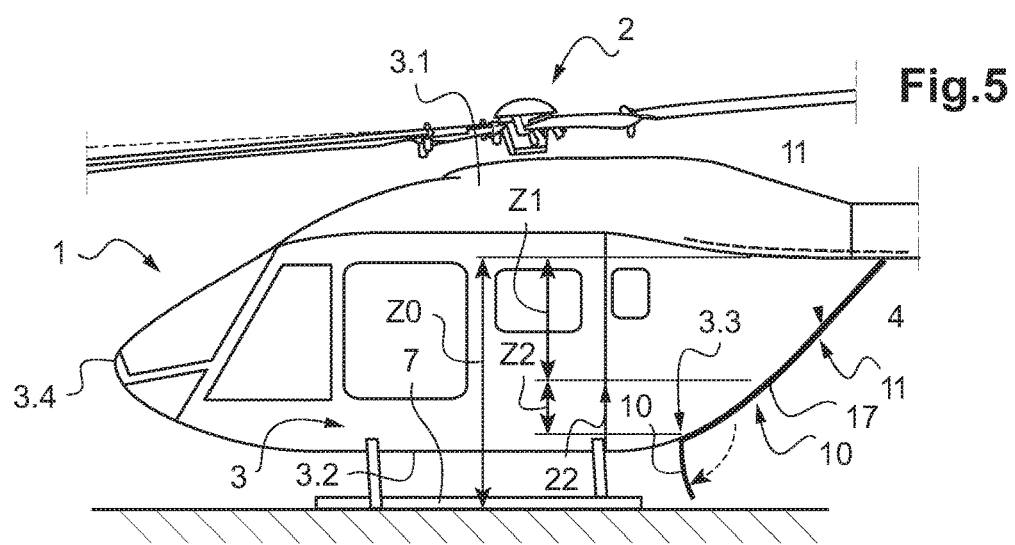
FIG. 5 represents several geometrical features of the rear door and the auxiliary door.

FIG. 5 shows particular examples of the geometry of the rear door 11 and of the auxiliary door 10. A first height Z0 is defined as the maximum elevation difference between the points of the landing gear 7 and the points of the rear opening 4. In a preferred embodiment, Z0 ranges between 0.5 and 1.2 times the fuselage width; more preferably 0.925 times.

A second height Z1 is defined as the maximum elevation difference between points of the rear door 11 when the rear door 11 is at the first position F. Z1 ranges, in an embodiment, between 0.2 and 0.85 times the fuselage width; more preferably 0.4 times.

A third height Z2 is defined as the maximum elevation difference between points of the auxiliary door 10 when the auxiliary door 10 is at a position in which the rear door 11 and the auxiliary door 10 complementary close the rear opening 4. Z2 ranges, in an example, between 0 and 0.5 times the fuselage width; more preferably 0.16 times. The zero value corresponds to the embodiments wherein there is no auxiliary door 11.

Taking advantage of the lack of obstacles at the rear opening 4, the auxiliary door 10 may include further features to improve, even more, the access to the interior of the fuselage 3.

Figure 6:
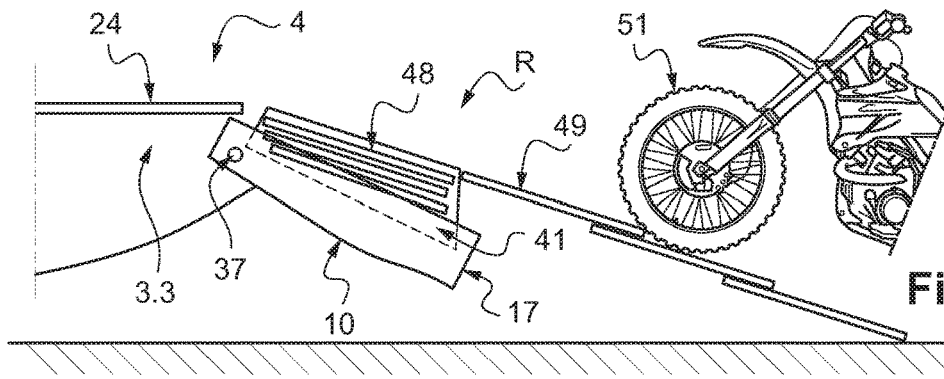
FIG. 6 represents a rear door suitable for being a ramp cargo door, further comprising an extension ramp, the rear door comprising tracks.
Figure 7:
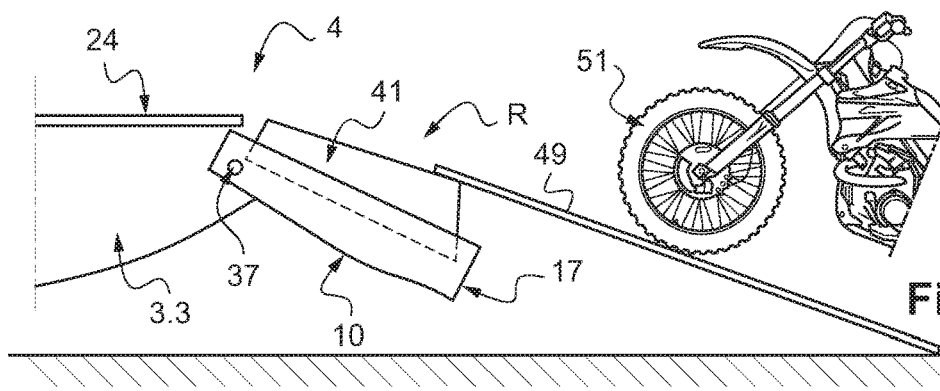
FIG. 7 depicts an embodiment as that of FIG. 6, except in that the rear door does not have tracks and in that the extension ramp is not extendable.

In some embodiments, the locking means locks the auxiliary door 11 at a third outward position R suitable for being used as a cargo ramp door, as represented in FIGS. 6 and 7.

Such position can be combined with the provision of any load assisting means, such as extension ramps 49 suitable for linking the auxiliary door 10 and the ground. The embodiments of FIGS. 6 and 7 both comprise an extension ramp 49, thanks to which a wheeled vehicle 51 can easily access the floor 24 of the interior of the fuselage 3.

In the embodiment of FIG. 6, the extension ramp 49 is extendable, and tracks 48 are provided on the auxiliary door 10, concretely, on a surface of the auxiliary integrated storage compartment 41, to help guide the wheeled vehicle 51 towards the floor 24 of the fuselage 3. The extension ramp 49 of the embodiment of FIG. 7 is of fixed length and the auxiliary door 10 does not comprise tracks 48.

FIGS. 8, 9 and 10 show another example of load assisting means—the auxiliary door 11 comprises a step 53, 54, 55 suitable for allowing the access of a person 16 to the interior of the fuselage 3. In these embodiments, the provision of the step 53, 54, 55 is associated to an auxiliary door 10 lockable when in vertical position, i.e. at the second outward position V.

In the embodiment of FIG. 8, the step 53 is of foldable type—in its folded position, the step 53 extends on the auxiliary integrated storage compartment 41, and in the unfolded position, the step 53 is substantially horizontal, according to the reference of the figure.

In the embodiment of FIG. 9, the step 54 is formed within the body of the auxiliary integrated storage compartment 41.

In the embodiment of FIG. 10, the top surface of the auxiliary integrated storage compartment 41 forms the step 55.

REFERENCES

1.—Rotorcraft
2.—Rotor
3.—Fuselage
3.1.—Upper part of the fuselage
3.2.—Lower part of the fuselage
3.3.—Rear part of the fuselage
3.4.—Nose of the fuselage
4.—Rear opening
7.—Landing gear
10.—Auxiliary door
11.—Rear door
16.—Person
17.—Closing boundary
22.—Frame of the fuselage
24.—Floor of the fuselage
26.—Second link
27.—First link
33.—Second door attaching means
34.—Second fuselage attaching means
35.—First fuselage attaching means
36.—First door attaching means
37.—Auxiliary pivoting means
38.—Mount
39.—Bearing
40.—Auxiliary damper
41.—Auxiliary integrated storage compartment
42.—Integrated storage compartment
43.—Auxiliary mount
44.—Strap
45.—Tube
48.—Tracks
49.—Extension ramps
51.—Wheeled vehicle
53.—Step
54.—Step
55.—Step
F.—First position
I.—Intermediate position
S.—Second position
H.—First outward position
V.—Second outward position
R.—Third outward position
Z0.—First height
Z1.—Second height
Z2—Third height
Z3.—Fourth height
Z4.—Fifth height
α.—First link angle
β.—Second link angle
Ω.—Auxiliary door angle

What is claimed is:

1. An aircraft comprising:
a rear door,
a landing gear,
a fuselage extending longitudinally between a nose and a rear part, and extending in elevation between a lower part and an upper part, the lower part being the part of the fuselage on which the landing gear is mounted and the rear part in turn comprising a rear opening, at least a portion of the rear opening configured to be closed by the rear door,
an auxiliary door pivotally connected to the fuselage and configured to open outwardly with respect to the fuselage, the auxiliary door configured to close at least another portion of the rear opening, wherein the auxiliary door is configured to lock at (i) a first outward position (H) with respect to the fuselage in which the auxiliary door extends along the longitudinal direction of the aircraft, and (ii) a second outward position (V) with respect to the fuselage in which the auxiliary door extends along the elevation direction of the aircraft, and
an arrangement comprising:
a first link comprising:
a first main body,
a first door attaching means, and
a first fuselage attaching means,
wherein the first main body extends along a first length (L1) between the first door attaching means and the first fuselage attaching means, and the first link is pivotally attached to the rear door by means of the first door attaching means and is pivotally attached to the fuselage at a first end by means of the first fuselage attaching means, and
a second link comprising:
a second main body,
a second door attaching means, and
a second fuselage attaching means,
wherein the second main body extends along a second length (L2), greater than the first length (L1), between the second door attaching means and the second fuselage attaching means, and the second link is pivotally attached to the rear door by means of the second door attaching means and is pivotally attached to the fuselage at a first end by means of the second fuselage attaching means,
wherein the first and second fuselage attaching means are attached to the fuselage,
wherein the second fuselage attaching means is located longitudinally closer to the nose of the fuselage than the first fuselage attaching means,
such that when the first and the second links rotate around the first and the second fuselage attaching means, the rear door rotates around the first and the second door attaching means, so that the rear door can be inwardly displaced in the longitudinal direction and in the elevation direction between a first position (F) wherein the rear door closes the at least a portion of the rear opening and at least a second position (S) at the interior of the fuselage wherein the rear door extends along the longitudinal direction, and wherein a longitudinal axis of the first link and a longitudinal axis of the second link intersect at a location within the fuselage and above the first ends of the first and second links with the rear door in the first position (F).

2. The aircraft of claim 1, wherein the first fuselage attaching means is located, in elevation, closer to the lower part of the fuselage than the second fuselage attaching means.

3. The aircraft according to claim 1, wherein, when the rear door is at the first position (F), the first door attaching means is located longitudinally farther from the nose than the first fuselage attaching means, and the second door attaching means is located longitudinally closer to the nose than the second fuselage attaching means.

4. The aircraft according to claim 1, wherein each one of the first and second door attaching means and of the first and second fuselage attaching means comprises a bearing.

5. The aircraft according to claim 1, wherein the rear door and the auxiliary door cooperate with one another to close the rear opening in a complementary manner, the rear door and the auxiliary door being in contact along a closing boundary when both the rear door and the auxiliary door close the rear opening.

6. The aircraft according to claim 5, wherein the auxiliary door is pivotally connected to the fuselage by means of an auxiliary pivoting means.

7. The aircraft of claim 1, wherein the auxiliary door is further configured to lock at a third outward position (R) with respect to the fuselage in which the auxiliary door is configured for being used as a cargo ramp door.

8. The aircraft of claim 1, wherein the auxiliary door comprises tracks configured for allowing the access of a vehicle to the interior of the fuselage.

9. The aircraft of claim 1, wherein the auxiliary door comprises a step configured for allowing the access of a person to the interior of the fuselage.

10. The aircraft of claim 1, wherein the rear door comprises:
an integrated storage compartment.

11. The aircraft of claim 1, wherein the auxiliary door comprises:
an auxiliary integrated storage compartment.

12. The aircraft of claim 1 wherein, when the rear door is positioned in the first position (F), the first link extends from the fuselage towards the rear part of the fuselage, and the second link extends from the fuselage towards the nose of the fuselage.

13. An aircraft comprising:
a fuselage extending in a longitudinal direction between a nose and a rear part, and extending in an elevation direction between a lower part and an upper part, the rear part defining a rear opening;
a landing gear mounted on the lower part of the fuselage;
a rear door supported by the fuselage and configured to at close at least a portion of the rear opening in a first position (F);
a first link member having first and second opposed ends such that the first link member extends along a first length (L1), the first end pivotally connected to the fuselage and the second end pivotally connected to the rear door;
a second link member having first and second opposed ends such that the second link member extends along a second length (L2), the second length (L2) being greater than the first length (L1), the first end pivotally connected to the fuselage and the second end pivotally connected to the rear door;
an auxiliary door pivotally connected to the fuselage, and configured to close at least another portion of the rear opening, the auxiliary door configured to open outwardly relative to the fuselage;
wherein the first end of the second link member is positioned longitudinally closer to the nose of the fuselage than the first end of the first link member; and
wherein the first and second link members are configured such that when the first and second link members rotate relative to the fuselage, the rear door rotates relative to the first and second link members, thereby inwardly displacing the rear door in the longitudinal direction and in the elevation direction between the first position (F) and at least a second position (S), the rear door positioned within the interior of the fuselage with the rear door extending along the longitudinal direction in the second position (S);
wherein, when the rear door is positioned in the first position (F), the first link member extends from the fuselage towards the rear part of the fuselage, and the second link member extends from the fuselage towards the nose of the fuselage; and
wherein the auxiliary door is configured to lock in one of (i) a first outward position (H) with the auxiliary door extending along the longitudinal direction of the aircraft, and (ii) a second outward position (V) with respect to the fuselage with the auxiliary door extending along the elevation direction of the aircraft.

14. The aircraft of claim 13 wherein, when the rear door is positioned in the first position (F), the second end of the first link member is positioned longitudinally between the first end of the first link member and the rear part of the fuselage, and the second end of the second link member is positioned longitudinally between the first end of the second link member and the nose of the fuselage.

15. The aircraft of claim 14 wherein, when the rear door is positioned in the first position (F), the first end of the first link member is positioned in elevation between the first end of the second link member and the rear door.

16. The aircraft of claim 13 wherein a longitudinal axis of the first link member and a longitudinal axis of the second link member intersect at a location within the fuselage and above the first ends of the first and second link members.

17. The aircraft of claim 13 wherein the auxiliary door is further configured to lock in a third outward position (R) with respect to the fuselage in which the auxiliary door is configured for use as a cargo ramp door.

* * * * *